Aug. 24, 1926.

W. D. MORRISON 1,597,612

GLASS BLOWING MACHINE

Filed Oct. 11, 1921    6 Sheets-Sheet 1

Fig. 1.

Inventor:

W. D. Morrison

By Lawrence Langner

Attorney

Aug. 24, 1926.

W. D. MORRISON 1,597,612

GLASS BLOWING MACHINE

Filed Oct. 11, 1921

Inventor:
W. D. Morrison
Lawrence Langner
Attorney

Aug. 24, 1926.

W. D. MORRISON

GLASS BLOWING MACHINE

Filed Oct. 11, 1921

Inventor:
W. D. Morrison
By Lawrence Langner
Attorney

Aug. 24, 1926.

W. D. MORRISON 1,597,612

GLASS BLOWING MACHINE

Filed Oct. 11, 1921          6 Sheets-Sheet 4

Inventor:
W. D. Morrison

Lawrence Langner
Attorney.

Aug. 24, 1926.

W. D. MORRISON 1,597,612

GLASS BLOWING MACHINE

Filed Oct. 11, 1921      6 Sheets-Sheet 5

Inventor:
W. D. Morrison
By
Lawrence Langner
Attorney

Aug. 24, 1926.

W. D. MORRISON 1,597,612

GLASS BLOWING MACHINE

Filed Oct. 11, 1921    6 Sheets-Sheet 6

Inventor:
W. D. Morrison

By Lawrence Langner

Attorney

Patented Aug. 24, 1926.

1,597,612

UNITED STATES PATENT OFFICE.

WALTER DEVLIN MORRISON, OF NEWPORT, NEAR MELBOURNE, VICTORIA, AUSTRALIA.

GLASS-BLOWING MACHINE.

Application filed October 11, 1921, Serial No. 507,118, and in Australia November 1, 1920.

This invention relates to improvements in glass blowing machines and has been devised in order to provide an automatic machine which will considerably facilitate the operation of glass blowing and which will not only dispense with labour but embodies means whereby the output in relation to ordinary machines can be greatly increased.

The basic principle underlying this invention consists in the provision in a glass blowing machine of means for automatically feeding one or a plurality of pattern and finishing moulds arranged radially and in sets around or upon a continually rotating table, which, combined with a superposed intermittently operating rotatable feed table, also provided with a corresponding number of receiving pockets for the molten material, which pockets are radially disposed, and spaced, each set corresponding in number with each set of pattern moulds employed, the feeding table being provided with means for delivering the molten glass at predetermined times to the pattern moulds by means of receiving cups disposed in a radial casing taking the delivery of predetermined quantities of molten glass from the tank and delivering same by means of a radially swinging cup bracket into the receiving orifices of the pattern moulds.

The preferred form of carrying this invention into practical effect will now be described and for the purposes of description the machine will be described as manufacturing bottles automatically, it being understood that one, two or more bottles may be simultaneously manufactured according to the capacity of the machine without departing from its spirit and scope.

According to this invention, a tank 1 extends from the furnace to a point near or adjacent the central vertical pillar 2 of the machine. This tank has one or more delivery orifices 3 disposed vertically and directly over the path of the cups 4 in each radial set on an intermittently operated rotatable feeding table 5 when each radial set of cups 4 register or are brought into line with the delivery orifices 3 of the tank 1.

Around the passages 3 leading from the tank 1 is a water circulation 6 which maintains the metal surfaces, which are in contact with the molten material from the melting pot or furnace, in a cool condition so preventing the molten glass from adhering thereto.

The intermittently operated rotatable feeding table 5 is arranged horizontally and is provided with a plurality of cups 4 arranged vertically in radial sets, which are spaced from each other, and each set is radially disposed and mounted to or carried by a sliding bar 7, and is adapted to operate in turn in line with the passages 3 leading from the tank 1 at predetermined times and each bar 7 is fitted with cutting surfaces 8 so that after the molten material drops into the particular set of cups 4 in the feeding table 5, the size of which are gauged according to the amount of molten material necessary for the formation of the particular bottle or container, the sliding bar 7 is automatically driven forwardly and the glass is given a sudden shear or cut owing to the action of the bar. This movement of the bar 7 is accomplished by compressed air mechanism 9 arranged and operating on the intermittent feed table 5.

Figure 6:
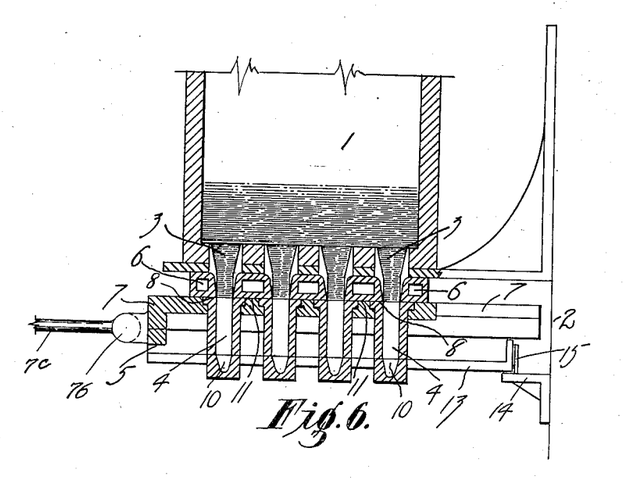
Figure 6 is a view in vertical central section of a portion of the intermittent feeding table and the means of delivering the viscous fluid from the furnace.
Figure 7:
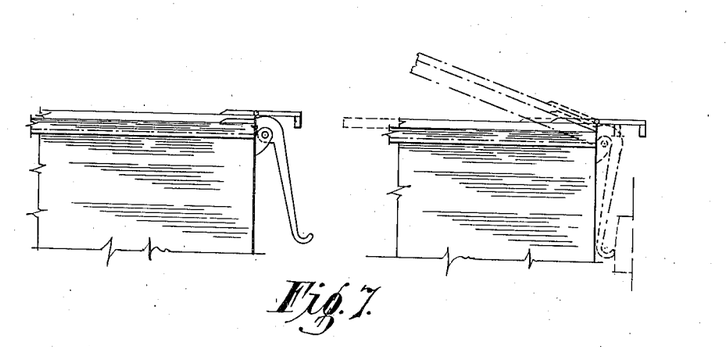
Figure 7 is a view illustrating the means for raising the mould cover plate.
Figure 8:
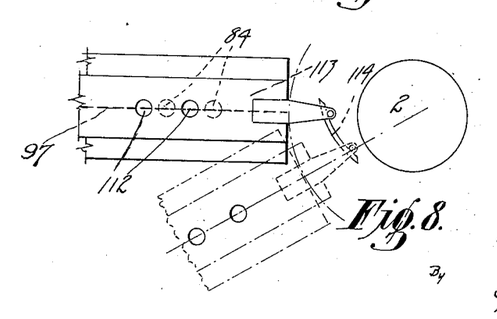
Figure 8 is a view in plan of the means for operating the sliding port bar of the mould cover plate.
Figure 9:
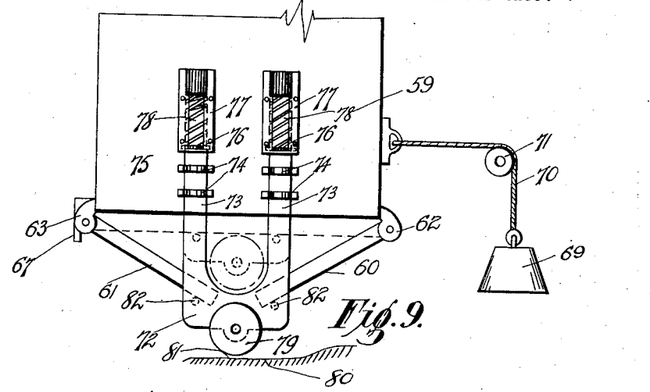
Figure 9 is a view illustrating the opening and closing means of the divided receiving cups disposed between the intermittent feeding table and the rotating mould table.
Figure 10:
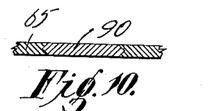
Figure 10 is a view illustrating the means of mounting the neck ring slide bars.
Figure 11:
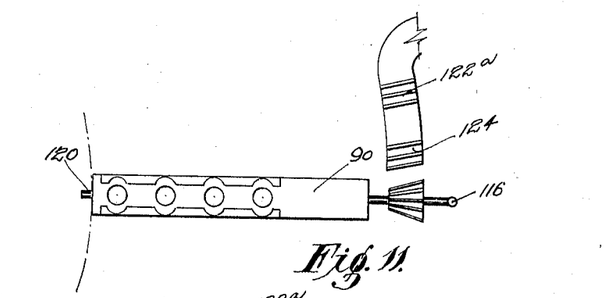
Figure 11 is a view illustrating the means employed for reversing the neck ring slide bar when it is at the station for delivering the manufactured bottles.
Figure 12:
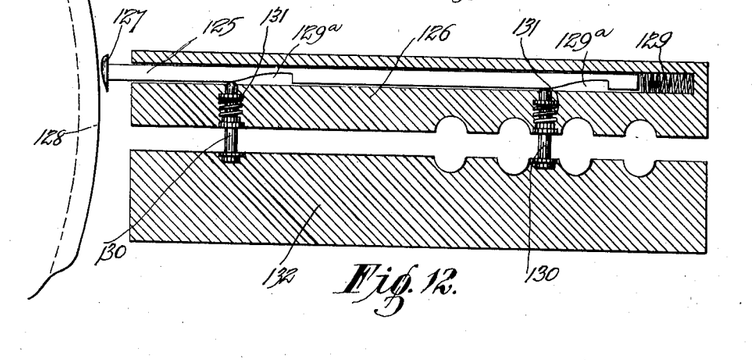
Figure 12 is a view illustrating the means for opening the neck rings at the bottle delivery station.
Figure 13:
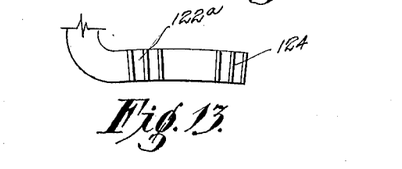
Figure 13 is a view illustrating the means employed for reversing the neck ring slide bars to normal position after the delivery of the bottles.
Figure 14:
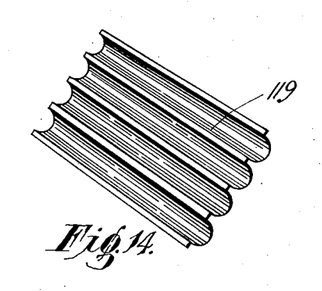
Figure 14 is a view particularly illustrating the delivery chute below the delivery station of the bottles.
Figure 16:
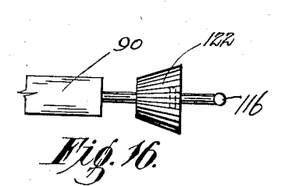
Figure 17:
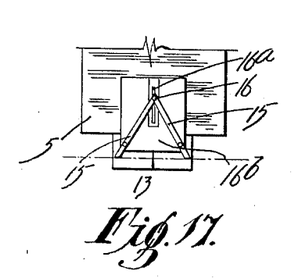
Figure 18:
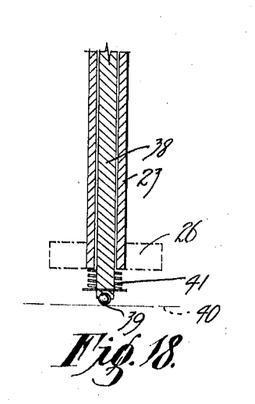

As illustrated in Figure 6, the bar 7 connects by the joint 7$^b$ with the piston rod 7$^c$ of the compressed air mechanism which performs a complete stroke to cut off the globule in the cups 4 as each set of cups on the table 5 are brought into line with the passages 3. This compressed air mechanism consists of a cylinder of the well-known type fitted to glass blowing machines.

Immediately the particular cups 4 on the feeding table 5 are filled, the shearing action above mentioned is completed and by the action of the air piston on the sliding bar 7 the charge is maintained in the cups 4 owing to the fact that the bottom orifices 10 thereof are closed until the predetermined period of opening takes place. After the shearing action is accomplished, the passages 3 from the tank 1 are closed by the solid portion 11 of the bar 7 between the cup orifices 4 and the table 5 is then rotated a step, the orifices 3 from the tank 1 being closed by the surface of the table until the next set of cups 4 on the table 5 are in line or register with the orifices 3 feeding from the tank 1 at which time the forward cups are discharging into automatically swinging receiving cups 12 which in turn deliver to pattern moulds in the manner hereinafter described.

The bottom orifices 10 are formed centrally along a divided door 13 which is normally open until the viscous fluid is about to be discharged from the tank through the passages 3 into the cups 4 of the feed table 5 and this door 13 remains closed until it functions to discharge the globules through short chutes or pathways into the intermediate receiving cups 12.

The door 13 during the period mentioned is held closed by passing over a fixed surface 14 in line with the closed position of the door and on contact with the surface 14 the divided portions of the door being connected by angular links 15 connecting a roller 16 slidably arranged in a vertical slot 16$^a$ in a fixed support 16$^b$ close simultaneously but when free of the surface 14, the door opens outwardly and downwardly to discharge the globules into the cups 12 as above described. After the discharge of the globules into the swinging cups 12 the slide 7 is returned to normal position by engaging a camway (not shown) on the central pillar.

Figure 3:
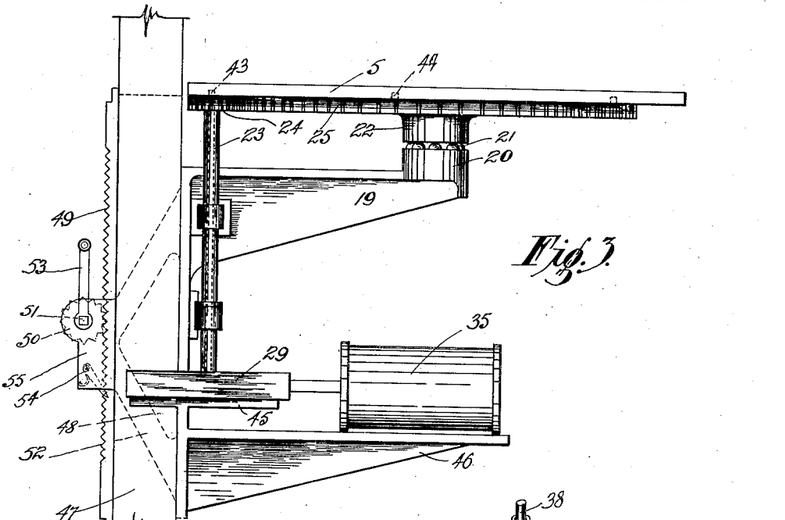
Figure 3 is a view in side elevation of the mounting and preferred driving means of the intermittent feeding table.
Figures 4, 5, 15:
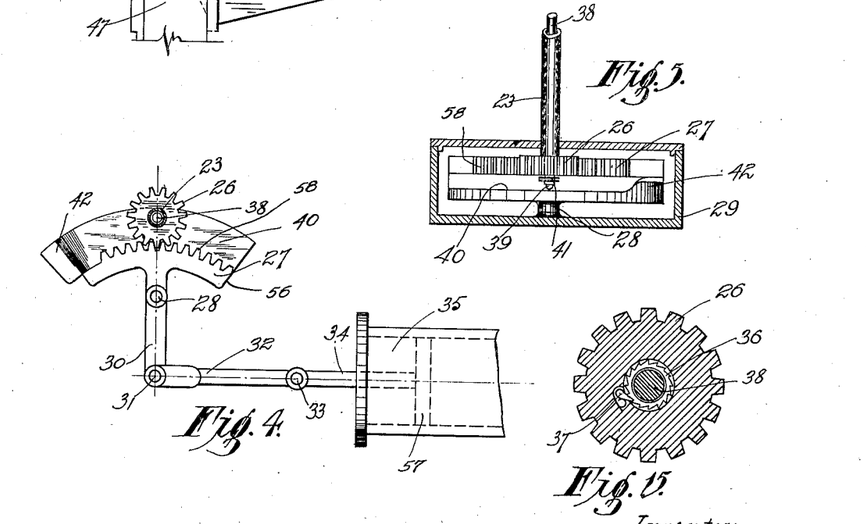
Figure 4 is a view in plan of the mechanism for obtaining the intermittent motion of the feeding table and the positive stop at the predetermined position of angular displacement where the table receives the viscous fluid from the furnace or melting pot.
Figure 5 is a view in elevation of the cam and driving pinion together with the means for locking the table.
Figures 15, 16, 17 and 18 are views illustrating essential details.

The feeding table 5 is operated as illustrated more particularly in Figures 3, 4 and 5 being mounted on a cantilever bracket 19 having a boss 20 cast thereon, the boss 20 being provided with a ball race 21 upon which the boss 22 of the feeding table 5 rotates. A hollow spindle 23 having a pinion 24 on its upper end adapted to engage a toothed surface 25 arranged under the table 5 and supported from the boss 22. On the lower end of the hollow spindle 23 is mounted a pinion 26 adapted to mesh with a cam and rack 27 which is pivoted at 28 to the bottom of a suitable casing 29.

The cam arm 30 is pivoted at 31 to a connecting rod 32 which in turn is pivoted at 33 to the piston rod 34 of a compressed air cylinder 35.

The pinion 26 is mounted on the hollow spindle 23 by means of a ratchet 36 on the hollow spindle 23 engaged by a pawl 37 on the pinion 26. Disposed through the hollow spindle 23 is an index bar 38 which extends below the bottom of the pinion 26 so that a ball joint 39 will ride on a surface 40 provided on the bottom of the casing 29. Arranged around the index bar 38 between the ball 39 and the underside of the pinion 26 is a compression spring 41 the object of which is to keep the ball 39 in constant engagement with the surface 40. On the one end of the surface 40 is a raised portion 42 of suitable contour which serves the function of lifting the index bar 38 when the cam and rack 27 moves in the direction of the raised portion 42. The upper end 43 of the index bar 38 may be suitably shaped so as to enter holes 44 spaced on the underside of the table 5 and locks the table positively in that position during the period of time necessary to deliver the molten material into the cups 4 of the table 5.

The cantilever bracket 19 is formed with brackets 45 and 46 for supporting the cam casing 29 and air cylinder 35 respectively and in order to raise and lower the feeding table 5 and its mechanism which may be necessary to replace the sliding bars 7, suitable raising and lowering devices are mounted to the bracket 19 and its supporting pillar 47.

The raising and lowering means consists in forming A arms on the cantilever bracket 19 and these arms extend through vertical slots 48 in the pillar 47.

Between the slots 48 in the pillar 47 is a rack 49 adapted to engage a pinion 50 mounted on a spindle 51 between extensions 55 of the A arms 52. The one end of the spindle 51 is squared to receive an operating handle 53 while a spring operated pawl 54 fitted to one of the extensions 55 also engages the rack 49 so that as the handle 53 is operated the table 5 is raised on the pillar 47 and when lowered the pawl 54 is released from the rack 49 until the desired position is reached.

The operation of the table 5 to move from one station to another is as follows:—

Assuming the pinion 26 to be at the end 56 of the cam 27, the piston 57 of the air cylinder 35 is driven forward which moves the cam 27 from the pivot 28 causing the cam 27 to turn the pinion 26 in the direction in which the table 5 is to be turned. By the time the necessary angle of displacement has been obtained on the table 5, the pinion 26 ceases to function for the reason that the teeth 58 finish before reaching the raised portion 42 which allows the index bar 38 to be carried until it rises on the raised portion 42 and enters the particular hole 44 in line on feeding table 5. On the return of the piston 57, the index bar 38 clears the raised portion 42 before the pinion 26 meshes with the cam 27 and as the pinion 26 is engaged with the ratchet about the hollow spindle 23, the hollow spindle is neutral and does not operate on the return movement but when the piston 57 again commences a forward stroke, the ratchet 36 engages the pawl 37 and the table 5 is moved to the next station.

The charges of molten material from the feeding table 5 are delivered as above described to receiving cups 12 formed in a casing 59.

The receiving cups 12 are of a number corresponding to the number of passages in each radial set on the feeding table 5 and are formed vertically in a radially disposed swinging casing 59, the top of the orifices being open to present an unobstructed passage for the molten material while the bottom is closed by centrally divided doors 60 and 61 pivoted in lugs 62 and 63 on either side of the casing 59 and at the lower edges thereof, and when the doors are open a free passage is presented to the molten material to allow it to pass into the pattern moulds.

The receiving casing 59 is carried forward by means of a trip bar 64 mounted in the mould table 65 so that when the bar 64 rises on the cam surface 66, the bar 64 lifts and engages the depending lug 67 on the bottom of the cup casing 59. As the mould table 65 advances the bar 64 engages the depending lug 67 on the bottom of the receiving casing 59 and it is carried forward for just sufficient period to enable it to discharge its molten contents. In order to raise and lower the receiving casing 59 toward or away from the pattern moulds a collar 59ª encircles the divided pillar 2 and has an extension 59ᵇ to carry a toothed pinion 59ᶜ meshing with a rack 59ᵈ provided in the central pillar 2.

The bar or pin 64 operates against the compression of a spring 68 and when it is past the cam surface 66 it drops and releases the casing 59 which automatically returns to its normal position by the weight 69 on flexible connection 70 working over a pulley 71 on a bracket fixed to the central pillar 2.

During the swinging motion of the casing, the pivoted doors 60 and 61 are automatically opened downwardly and outwardly by means of a sliding connecting plate 72 formed with parallel arms 73 sliding in guides 74 and mounted to the inner end wall 75 of the swinging casing 59.

The ends of the arms 73 are fitted with buffers 76 which operate in brackets 77 against the compression of springs 78, the springs serving the function of always tending to keep the doors 60 and 61 open.

The lower end of the plate 72 is fitted with a roller 79 which rides on an undulatory surface 80 mounted on the central pillar 2 so that when the roller 79 is in the depression 81 of the surface 80, the spring 78 forces the plate 72 downwardly and the doors being thus released open against the rollers 82 on the plate 72 and allow of sufficient clearance for the globules of viscous fluid to drop from the cups 12 into the orifices 83 of the pattern moulds 84 on the rotating mould table 65.

Immediately the globules fall from the cups 12, the doors are again closed owing to the roller 79 leaving the depression 81 of the surface 80, and as above described, the weight 69 returns the swinging casing 59 back to receive viscous fluid from the next set of radial cups on the feed table 5.

Below the swinging cup casing 59 is the mould table 65 disposed horizontally and being continuously revolved by having mounted below it, a circular worm wheel 85 adapted to gear with a worm 86 on a driven shaft 87 so as to provide for the continuous rotation of the mould table 65 around the central pillar 2, the speed being timed as required. This mould table 65 is provided on the top surface with a plurality of sets of pattern moulds 84 and finishing moulds 88, the finishing moulds being arranged radially outside each set of pattern moulds and any suitable number of sets may be employed according to the capacity of the table and to the number of feeding cups or passages employed for the molten material.

The finishing moulds 88 are arranged in a position reverse to the ordinary usages of the art, that is to say they are arranged with the neck downwards as in the manner of the pattern moulds and each set of pattern and finishing moulds is provided with the required number of neck rings 89 formed on a sliding bar 90 which is adapted to slide the pattern moulded bottles outwardly and radially to its respective set of finishing moulds 88 which are blown or finished by air pressure upwardly through the depending necks of the bottles.

According to the description herein and as an instance of a machine constructed according to this invention the moulds on the tables would be in radial sets of eight, the inner four of each set being the pattern moulds and the outer four of each set being the finishing moulds.

The central pillar 2 of the machine around which the mould table 65 revolves is hollow and divided so as to provide a vacuum chamber 91 communicating with the source of suction and with compressed air chambers 92 in communication with the source of air pressure supply. From these chambers 91 and 92, passages 93, 94 lead to allow communication passages to box like compartments 95 of the table 65 arranged below and forming a part of the table proper, so that when the table reaches a position opposite the orifices 93, of the respective chambers of the pillar 2, a vacuum is created in the chamber 96 leading to the pattern shapes in the moulds 84, the opening and closing of the ports of the vacuum chamber and the compressed air chambers being predetermined according to the position of the neck rings in the moulds in which the bottles are to be formed and blown.

The moulds are centrally divided as at 97 to allow the neck rings to enter the respective positions, and are opened by any suitable means but preferably by rollers 98 working in a cam pathway 99 arranged below the mould table and fitted around the periphery of the central column or pillar 2 of the machine. Each roller 98 connects a plate 100 below the moulds and this plate is provided with clearance space 101 for the plungers 102 arranged to form the neck holes in the patterns.

As the rollers 98 move the cam surface 99, the plate 100 moves outwardly and being provided with the diagonal slots 103 which receive depending pins 104 of the divided mould plate 105 the pins being in the path of short radial slots 106 in a web 107 of the mould table 65 thus allowing of the opening of the moulds 84 and 88 to allow of the movements of the neck rings.

It will be obvious that any other suitable means may be embodied for opening and closing the moulds.

During the blowing up process in the pattern formation and in the finishing moulds, the said moulds are closed at the top by a cover 108 pivoted to a bracket 109 carried at the back of the pattern mould and provided with a downwardly projecting arm 110 adapted to move on a curved surface 111 on the pillar 2, the said surface 111 being arranged around and to the central pillar of the machine with surfaces at the particular points where the cover 108, is to be opened. To allow of the blowing up and finishing processes in the moulds, the cover 108 is of course, closed over the top of the moulds for the reason that the compressed air is blown upwardly from the underside into the neck of the bottle after the plungers 102 which form the neck of the bottle on the suction operation have been withdrawn from the pattern moulds and also during the finishing operation in the finishing moulds.

Thus the cover 108 is closed over the pattern moulds 84 after the plungers 102 are withdrawn and during the blowing up steps and until the transfer of the pattern blanks to the finishing moulds thus according to the number of radial mould sets, so a corresponding number of covers are employed, the covers over the pattern moulds being provided with feeding passages 112 which are closed at the required time by a sliding port bar 113 engaging a camway 114 on the pillar 2. The plungers 102 operate over the cam surface 66 against the compression of spring 115 at the period above described.

The mould table 65 is provided as above described with a plurality or radial sets of pattern moulds 84 and finishing moulds 88 and each set is provided with neck rings 89 arranged on a plate 90 sliding in suitable grooves. These neck ring plates are provided with rollers 116 or other extensions adapted at the period of time for the transference of the neck rings carrying the pattern blanks to the finishing moulds to move in a cam pathway 117 curving outwardly so that the neck rings and patterns are brought into position in the finishing moulds 88 and at another portion oppositely to the said cam pathway 117, a further cam pathway 118 is provided on the outside of the table which causes the neck ring plates to move in a path from the finishing position to its extreme position externally and clear of the finishing moulds 88 where tipping mechanism causes the neck ring plate 90 to be inverted to allow the finished bottles to automatically discharge on to a chute 119 adapted to deliver the bottles in upright position on to a conveyor.

Figure 1:
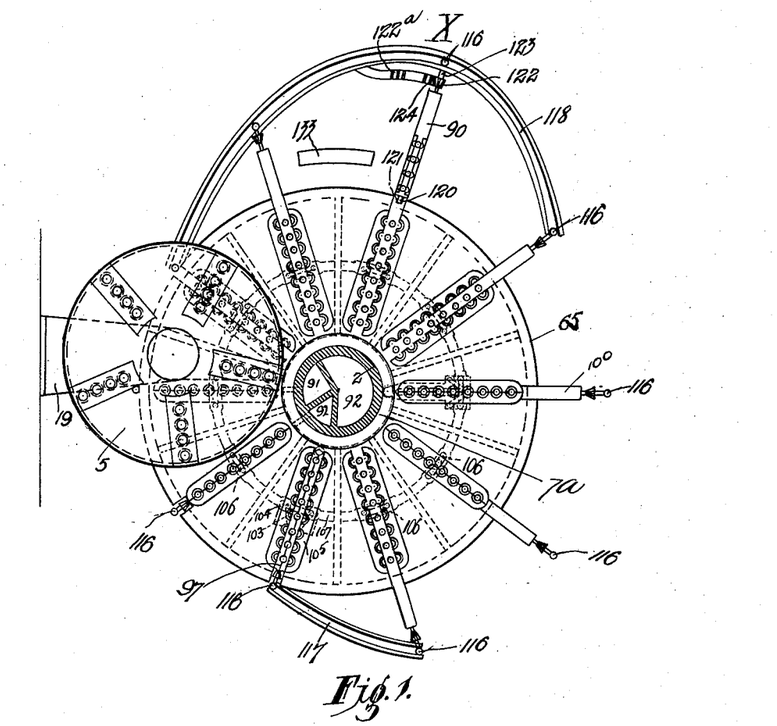
Figure 1 is a view in plan of intermittent feeding table and the rotating mould table with the essential parts carried thereby.
Figure 2:
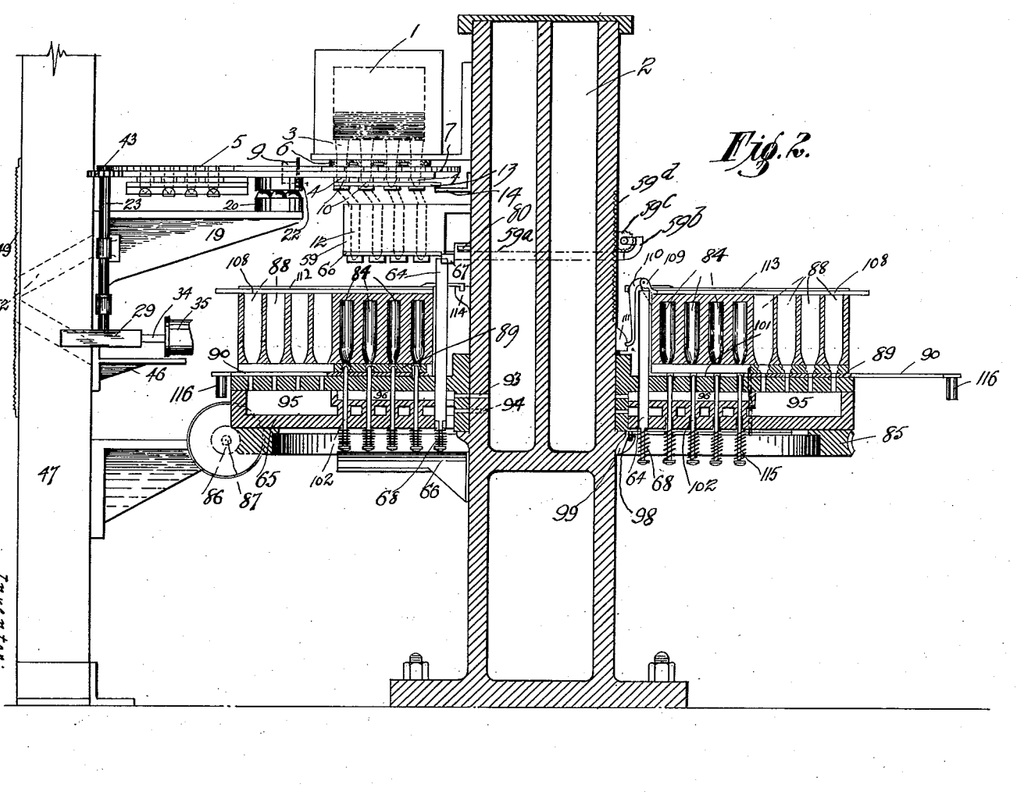
Figure 2 is a view in vertical central section of the machine.

The neck ring plate bar 90 carrying the blown bottles at the extreme outer position as indicated at the position X Figure 1 is inverted preferably by forming the inner ends of the plate bars with a projecting pin 120 which at this position is adapted to drop into an inclined recess 121 at the outer edge of the mould table 65.

The outer end of the neck ring plate bar 90 is fitted with a bevel pinion 122 having loosely mounted thereto the jointing member 123 having the roller working in the cam pathway 118 connected thereto.

The bevel pinion 122 is adapted to mesh with a toothed projection 124 so as to invert the neck ring plate bar 90 and in this position the bottles are suspended in upright position.

To release the bottles by opening the neck rings suitable mechanism is provided.

This mechanism consists of a bar 125 slidably arranged on one half 126 of the neck ring plate and is provided outside the inner end with a head 127 adapted to engage a fixed cam surface 128. This operation forces the bar 125 against the compression of spring 129 which always has the tendency to close the neck rings.

This bar is notched as at 129ª and in these notches normally rest the ends of pins 130 surrounded by compression springs 131 in recesses of the neck ring portion 126. These pins 130 are embedded in the other portion 132 of the neck ring plate and the mechanism functions so that when the head 127 leaves the cam pathway 128, the bar 125 moves outwardly allowing the pins 130 to enter the notches 129 and so close the neck rings but when the head 127 is in engagement with the cams 128 the bar 125 is forced inwardly and the pins 130 are forced out of the notches 129 so opening the neck rings.

Immediately the bottles are discharged, the neck ring plate and sliding bar are returned to normal by a continuation of the toothed projection 124, and on the bevel pinion 122 meshing with the second toothed portion 122ª the neck ring plate and sliding bar complete one turn and by this time have been carried so far as to allow the neck ring plate and slide bar to be back in its selected position, and in this position it is properly supported until the neck ring plate returns to the mould table 65.

When the neck rings open the bottles are suspended in an upright position and drop directly into a chute connecting a moving conveyor.

The cam pathway 118 above described, from the point of tipping, then curves inwardly to allow the neck rings to come into position preparatory to the next operation for forming the patterns on that particular set of moulds.

In operation the viscous fluid from the tank 1 or melting pot passes through the passage or passages 3 through the shearing bar 7 into the receiving cups 4 on the rotating feeding table 5, the feeding table being intermittently rotated and provided with means for automatically opening the feeding pockets 4 when they are brought into position over the swinging casing carrying the receiving cups 12 above described.

When the pattern moulds 84 are in position under the receiving cups 12 of the swinging casing, trip mechanism allows of the opening of the closure doors 60, 61, of the said casing 59 and for a maximum period of time the swinging casing 59 is carried around at the same speed of travel as the mould table 65 and a maximum period of time is allowed the viscous fluid to flow into the pattern moulds 84.

Preparatory to the automatic application of the vacuum to the pattern moulds 84, plungers automatically enter the neck rings to form the neck of the bottle and the patterns are drawn with the plungers 102 in position in the neck ring, the plungers 10 remaining in that position during the drawing of the patterns while clearance is provided to allow of the vacuum to operate past the plungers. The plungers are then withdrawn from the necks and the cover slide 112 of the patterns is then closed and the patterns blown up and after the patterns are formed in the moulds, the table being continually operated, the next operation consists in opening the pattern moulds 84 and by means of a cam pathway 117 forcing the neck ringplate outwardly, the neck rings carrying the pattern blanks into position in the finishing moulds 88.

The moulds are then closed and when the passage for the pressure leading to the finishing moulds is opposite the pressure feed 94 in the central pillar 2 of the machine, the bottles are blown and finished. After this operation, a period of movement takes place around the table to allow of cooling, when the moulds are again opened, and the neck ring bar working outwardly over the pathway in the oppositely disposed cam surface 118, causes the neck rings and the bottles carried thereby to clear the moulds and at this point the discharging operation takes place, the bottles are removed and the neck rings returned to position in their particular set in the pattern moulds by a return cam path 118 preparatory to reforming the next set of patterns, thus according to the number of sets arranged radially on the continually operating mould table 65, and the corresponding number of sets on the intermittent feeding table 5, so a greater or less capacity for the machine is embodied and each successive set on the table performs the functions above described, and by providing the automatic mechanism and drive for the parts a maximum output is accomplished in a minimum of space and in a cheap and effective manner, and I desire it to be understood that according to the capacity of the cups and the size of the moulds, so varying weights and sizes of bottles can be produced and it will be readily understood that different shapes and weight in bottles can be produced by the machine in a single operation.

What I claim as my invention and desire to secure by Letters Patent is:—

1. In glass blowing machines, the combination therewith of at least one pattern and finishing mould arranged radially, and in sets upon a rotating table, a superposed intermittently operated rotatable feed table provided with a number of receiving pockets radially disposed in sets, each set corresponding in number to each set of pattern moulds on the mould table, a feed tank, a plurality of feeding orifices from the tank, an automatically operating sliding bar positioned below the feeding orifices and fitted to the feeding table, and receiving cups disposed in a radial casing below the sliding bar, the cups delivering globules into the receiving orifices of the pattern moulds 2. In glass blowing machines, a feeding table provided with a plurality of vertical cups arranged in radial sets and adapted to receive globules of viscous fluid from a tank leading from the furnace, means for intermittently operating said table comprising a cantilever bracket having a boss provided with a ball race receiving a boss on the feeding table, a hollow spindle having a pinion at its upper end engaging a tooth surface arranged under the table, the lower end of the hollow spindle being provided with a pinion meshing with a cam pivoted to the bottom of a casing, the cam arm being further pivoted to a connecting rod pivoted to the piston rod of a compressed air cylinder, mounting the pinion to the hollow spindle by means of a ratchet on the hollow spindle engaged by a pawl on the pinion, an index bar extending through the hollow spindle adapted at predetermined times to enter holes in the feeding table and lock the same for a period, forming the underside of the index bar with a ball and mounting a helical spring between the boss and the underside of the pinion, a raised surface in the casing of suitable contour to lift the index bar to lock the table, the parts being so disposed that the ratchet only engages the pawl on each forward stroke of the piston as specified.

3. In glass blowing machines, a feeding table provided with a plurality of vertical cups arranged in radial sets and adapted to receive globules of viscous fluid from a tank leading from the furnace, means for intermittently operating said table comprising a cantilever bracket having a boss provided with a ball race receiving a boss on the feeding table, a hollow spindle having a pinion at its upper end engaging a tooth surface arranged under the table, the lower end of the hollow spindle being provided with a pinion meshing with a cam, pivoted to the bottom of a casing, the cam arm being further pivoted to a connecting rod pivoted to the piston rod of a compressed air cylinder, mounting the pinion to the hollow spindle by means of a ratchet on the hollow spindle and engaged by a pawl on the pinion, an index bar extending through the hollow spindle adapted at predetermined times to enter holes in the feeding table and lock the same for a period, forming the underside of the index bar with a pawl and mounting a helical spring between the boss and the underside of the pinion, a raised surface in the casing of suitable contour to lift the index bar to lock the table, the parts being so disposed that the ratchet only engages the pawl on each forward stroke of the piston and means for raising and lowering the feeding table and its connections by means of a fixed ratchet and a pawl and a pinion engaging said ratchet operable by a handle for the purposes specified.

4. In glass blowing machines, the combination with an intermittently rotated feeding table formed with vertically disposed cups arranged in radial sets, and the continuously rotated mould table, of means such as a radially swinging casing formed with receiving cups and provided with opening doors at its lower surface, the doors being opened to deliver the viscous fluid to the pattern moulds on the mould table by means of a sliding connecting plate formed with parallel arms mounted to the inner wall of the casing, buffers at the end of the arms operating in brackets against the compression of springs and mounting on the lower end of the plate, a roller adapted to engage an undulatory surface so that when the roller is in the depression of the surface, the plate is forced downwardly and consequently the doors are released, the doors being automatically closed on the return movement of the casing substantially as described.

5. In glass blowing machines, a rotating mould table formed with pattern moulds and finishing moulds in radial line, in one or more sets and arranged to be blown upwardly, a cover piece over the moulds pivoted to a bracket carried at the back of the pattern moulds and provided with a downwardly projecting arm adapted to move on a curved surface on a central pillar of the machine, and a sliding bar formed with ports fitted in the cover piece and adapted to operate over the pattern moulds as specified.

Signed at Melbourne, Victoria, Australia, this 5th day of September, 1921.

WALTER DEVLIN MORRISON.